US011677813B2

(12) United States Patent
Blagodurov

(10) Patent No.: US 11,677,813 B2
(45) Date of Patent: *Jun. 13, 2023

(54) DYNAMIC CONFIGURATION OF INTER-CHIP AND ON-CHIP NETWORKS IN CLOUD COMPUTING SYSTEM

(71) Applicant: Advanced Micro Devices, Inc., Sunnyvale, CA (US)

(72) Inventor: Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,116

(22) Filed: Jun. 14, 2021

(65) Prior Publication Data
US 2021/0409488 A1    Dec. 30, 2021

Related U.S. Application Data

(63) Continuation of application No. 15/265,402, filed on Sep. 14, 2016, now Pat. No. 11,064,019.

(51) Int. Cl.
| | |
|---|---|
| *H04L 67/1008* | (2022.01) |
| *H04L 41/0816* | (2022.01) |
| *H04L 45/30* | (2022.01) |
| *H04L 41/0896* | (2022.01) |
| *H04L 47/80* | (2022.01) |

(52) U.S. Cl.
CPC ...... *H04L 67/1008* (2013.01); *H04L 41/0816* (2013.01); *H04L 41/0896* (2013.01); *H04L 45/30* (2013.01); *H04L 47/805* (2013.01)

(58) Field of Classification Search
None
See application file for complete search history.

(56) References Cited

U.S. PATENT DOCUMENTS

| | | | |
|---|---|---|---|
| 2002/0065932 A1* | 5/2002 | Kobayashi | H04L 67/322 709/233 |
| 2002/0176564 A1* | 11/2002 | Saito | H04M 3/5183 379/265.01 |
| 2003/0016812 A1* | 1/2003 | Rodenbusch | H04M 3/5158 379/266.05 |
| 2003/0048785 A1* | 3/2003 | Calvignac | H04L 49/90 370/392 |
| 2005/0050202 A1* | 3/2005 | Aiken, Jr. | H04L 29/06027 709/227 |
| 2006/0120391 A1* | 6/2006 | Basu | H04L 67/1008 370/410 |

(Continued)

*Primary Examiner* — Scott B Christensen

(57) ABSTRACT

A server includes a plurality of nodes that are connected by a network that includes an on-chip network or an inter-chip network that connects the nodes. The server also includes a controller to configure the network based on relative priorities of workloads that are executing on the nodes. Configuring the network can include allocating buffers to virtual channels supported by the network based on the relative priorities of the workloads associated with the virtual channels, configuring routing tables that route the packets over the network based on the relative priorities of the workloads that generate the packets, or modifying arbitration weights to favor granting access to the virtual channels to packets generated by higher priority workloads.

20 Claims, 7 Drawing Sheets

(56) References Cited

U.S. PATENT DOCUMENTS

| | | | |
|---|---|---|---|
| 2008/0250099 A1* | 10/2008 | Shen | H04L 67/101 |
| | | | 709/203 |
| 2011/0296434 A1* | 12/2011 | Li | G06F 1/3253 |
| | | | 719/313 |
| 2013/0160026 A1* | 6/2013 | Kuesel | G06F 9/546 |
| | | | 719/313 |
| 2013/0185370 A1* | 7/2013 | Li | H04L 51/30 |
| | | | 709/206 |
| 2016/0182345 A1* | 6/2016 | Herdrich | G06F 12/084 |
| | | | 709/224 |
| 2017/0075838 A1* | 3/2017 | Nooney | H04L 49/1515 |

* cited by examiner

DYNAMIC CONFIGURATION OF INTER-CHIP AND ON-CHIP NETWORKS IN CLOUD COMPUTING SYSTEM

CROSS-REFERENCE TO RELATED APPLICATIONS

The present application is a Continuation application of U.S. patent application Ser. No. 17/347,116, entitled "DYNAMIC CONFIGURATION OF INTER-CHIP AND ON-CHIP NETWORKS IN CLOUD COMPUTING SYSTEM", and filed on Jun. 14, 2021, the entirety of which is incorporated by reference herein.

BACKGROUND

Description of the Related Art

Cloud computing systems typically implement large numbers of servers that communicate with each other over a network. For example, modern cloud computing systems can implement thousands or hundreds of thousands of interconnected nodes and each of the nodes can include multiple processing units such as central processing units (CPUs), graphics processing units (GPUs), accelerated processing units (APUs), digital signal processors (DSPs), application-specific integrated circuits (ASICs), field programmable gate arrays (FPGAs), and the like. The amount of data generated by the nodes for transmission over the network is growing rapidly and is expected to continue to grow as modern computing enters the Big Data and Big Compute eras. Although the latency and bandwidth of networks have been improved significantly in recent years, the network continues to represent a bottleneck in cloud computing systems.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
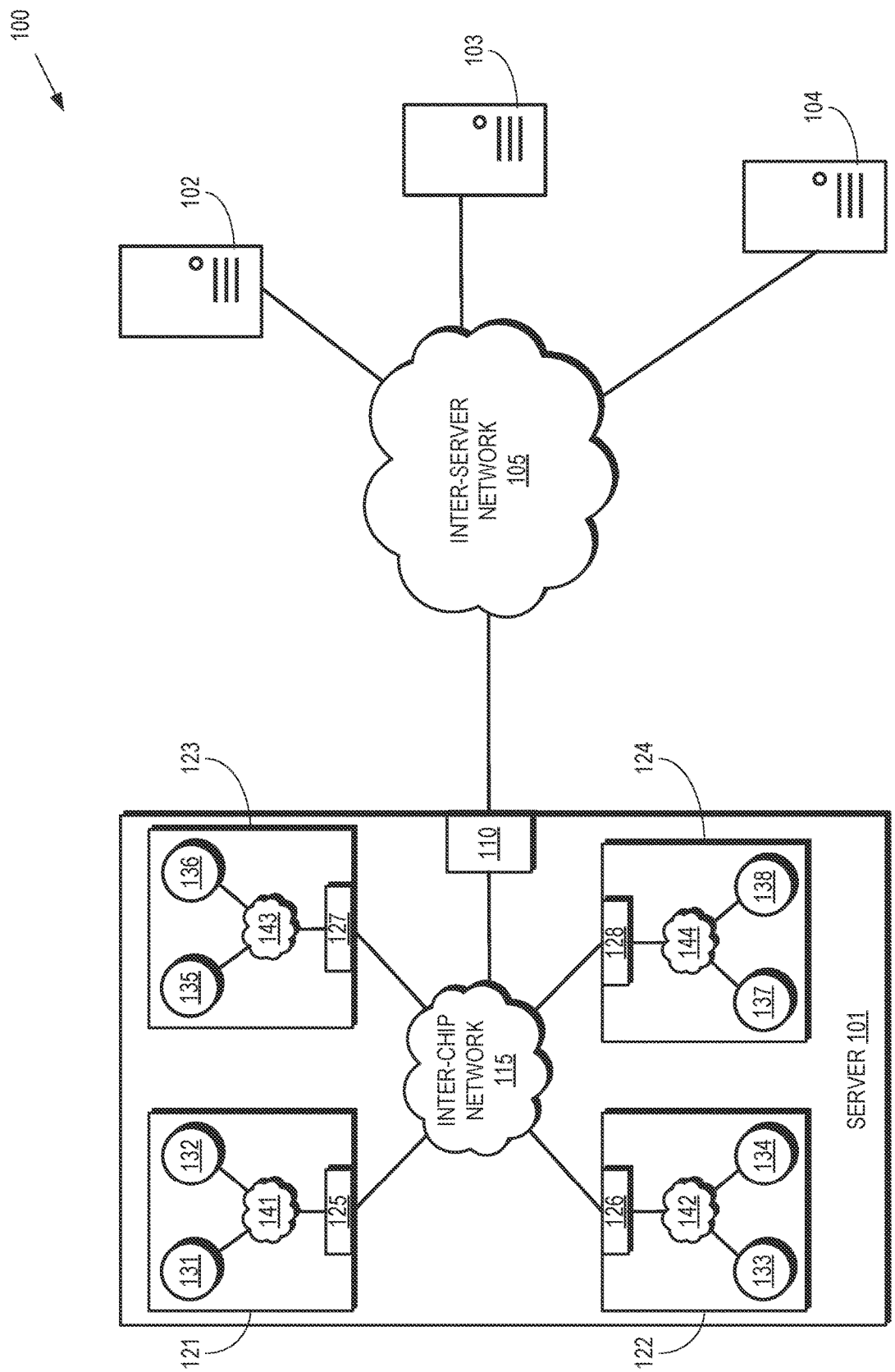
FIG. 1 is a block diagram illustrating an example cloud computing system according to some embodiments.

The network in a cloud computing system includes an inter-server network that is used to convey information between different servers, an inter-chip network that is used to convey information between different chips within a server, and an on-chip network that is used to convey information between processing units implemented on a single chip. As used herein, the term "on-chip network" refers to a network that is implemented or fabricated on a single die, substrate, or chip and used to interconnect entities that are also implemented or fabricated on the same die, substrate, or chip. The on-chip network is also used to convey information between the processing units and a memory interface to the inter-chip network. The on-chip networks can become bottlenecks for data communicated between the processing units implemented on the chips in a server. The on-chip networks can also limit the volume of data transmitted from the on-chip processing units to corresponding memory interfaces for communication over the inter-chip network to other chips in the server. In addition to becoming a bottleneck that decreases packet throughput, inefficient use of the network negatively impacts the energy budget of a cloud computing system. Memory subsystems in a cloud computing system consume an estimated 30% of the total energy budget of the cloud computing system. Inefficient use of the network to convey information to, from, and within the memory subsystems can therefore significantly impact the overall energy budget of the cloud computing system.

The time required to convey packets between nodes of an inter-chip or an on-chip network can be reduced, and the load on the inter-chip or the on-chip network can be optimized, by dynamically configuring the inter-chip or on-chip network based on characteristics of workloads generating packets for transmission over the inter-chip or the on-chip network. The workloads are executed on processing units such as CPUs, GPUs, APUs, DSPs, ASICs, or FPGAs, which are interconnected with each other and to other storage or input/output devices on the same chip by the on-chip network. The processing units on different chips within the same server are interconnected with each other by the inter-chip network. In some variations, dynamically configuring the inter-chip or the on-chip network includes allocating resources of the inter-chip or the on-chip network based on priorities of the workloads. For example, buffers can be allocated to virtual channels supported by the inter-chip or the on-chip network based on the number of packets generated by the workloads for transmission over the virtual channels and the relative priorities of the workloads. More buffers are allocated to virtual channels used by higher priority workloads. In some variations, dynamically configuring the inter-chip or the on-chip network includes routing packets generated by different workloads based on the relative priorities of the workloads. For example, a subset of interconnections between nodes of the inter-chip or the on-chip network can be preferentially allocated to transmit packets generated by high priority workloads. Peer-to-peer interconnections can also be preferentially allocated to packets generated by high priority workloads. In some variations, dynamically configuring the inter-chip or the on-chip network includes modifying arbitration weights to favor granting virtual channel access to packets generated by high priority workloads.

Workload priorities can be determined using traces collected for the code that generates the workloads. In some variations, the priority of the workloads is determined prior to runtime so that the inter-chip or the on-chip network can be dynamically configured based on the relative priorities of the workloads. For example, an off-line program analysis can be used to collect traces that identify memory intensive structures in the code. Memory intensive structures can become networking intensive, particularly if the memory is located on a remote memory node, and so memory intensive structures can be identified as high priority workloads. In some variations, the priority of the workloads is determined using traces that are collected concurrently with executing the code associated with the workloads. For example, a controller can collect traces by monitoring counters such as GPU performance counters, instruction based sampling (IBS) counters, counters in a cache hierarchy, north bridge counters, memory management unit counters, and the like. For another example, the controller can monitor log traces that include a log of events detected by the nodes connected to the on-chip network, such as page faults, hardware memory errors, and the like.

FIG. 1 is a block diagram illustrating an example cloud computing system 100 according to some embodiments. The cloud computing system 100 includes servers 101, 102, 103, 104, which are collectively referred to herein as "the servers 101-104." Operation of the servers 101-104 can be coordinated so that the cloud computing system 100 is able to execute code associated with applications that require more computing power than can be provided by a single server. The cloud computing system 100 is also able to store, access, and process more data than can be stored, accessed, or processed by a single server. The cloud computing system 100 can therefore be referred to as a system for performing Big Compute or Big Data applications, as well as other High Performance Computing applications. The cloud computing system 100 can also be referred to as a computing cluster. The servers 101-104 exchange information using an inter-server network 105 that is configured to convey packets between the servers 101-104. The packets have one or more headers that include information indicating the destination server (or node within the server) and a payload including the information that is being conveyed over the inter-server network 105.

Each of the servers 101-104 includes one or more interfaces to the inter-server network 105 and one or more chips that implement nodes for executing instructions to perform operations associated with applications that are supported by the cloud computing system 100. The server 101 includes an interface 110 that links the server 101 to the inter-server network 105. The server 101 also includes an inter-chip network 115 that conveys information between a plurality of chips 121, 122, 123, 124 (collectively referred to herein as "the chips 121-124") and the interface 110. The chips 121-124 are therefore able to exchange information with each other and exchange information with other chips (not shown in FIG. 1 in the interest of clarity) implemented in the servers 102-104 via the inter-server network 105. For example, the inter-chip network 115 is configured to convey packets between the chips 121-124 and the interface 110. The packets have one or more headers that include information indicating the destination chip or the destination server (or node within the server) and a payload including the information that is being conveyed over the inter-chip network 115.

The chips 121-124 are connected to the inter-chip network 115 by interfaces 125, 126, 127, 128, which are collectively referred to herein as "the interfaces 125-128." The chips 121-124 also implement processing units 131, 132, 133, 134, 135, 136, 137, 138, which are collectively referred to herein as "the processing units 131-138." Examples of the processing units 131-138 include CPUs, GPUs, APUs, DSPs, ASICs, FPGAs, and the like. In some variations, the processing units 131-138 implement multiple processor cores that are configured to execute instructions concurrently or in parallel. The processing units 131-138 implemented on each of the chips 121-124 exchange information with each other via corresponding on-chip networks 141, 142, 143, 144, which are collectively referred to herein as "the on-chip networks 141-144." For example, the processing units 131, 132 can exchange packets of information via the on-chip network 141. The processing units 131-138 are also connected to the interfaces 125-128 via the on-chip networks 141-144, so that the processing units 131-138 can exchange packets with each other via the corresponding on-chip network 141-144 and the inter-chip network 115. The processing units 131-138 can also exchange packets with processing units or other nodes implemented in other servers 102-104 via the inter-server network 105.

As discussed herein, the on-chip networks 141-144 can become bottlenecks for the packets that are exchanged between the processing units 131-138. The inter-chip network 115 can also become a bottleneck for the packets that are exchanged between the chips 121-124. The bottlenecks can be alleviated by dynamically configuring the inter-chip network 115 or the on-chip networks 141-144 based on characteristics of workloads that are generating packets for transmission over the inter-chip network 115 or the on-chip networks 141-144. In some variations, dynamically configuring the inter-chip network 115 or the on-chip networks 141-144 includes allocating resources based on priorities of the workloads, e.g., by allocating buffers to virtual channels supported by the inter-chip network 115 or the on-chip networks 141-144 based on numbers of packets generated by the workloads for transmission over the virtual channels and the relative priorities of the workloads. Dynamically configuring the inter-chip network 115 or the on-chip networks 141-144 can include routing packets generated by different workloads based on the relative priorities of the workloads, e.g., by preferentially allocating a subset of interconnections within the inter-chip network 115 or the on-chip networks 141-144 to transmit packets generated by high priority workloads. Dynamically configuring the inter-chip network 115 or the on-chip networks 141-144 can also include setting or modifying arbitration weights to favor granting virtual channel access to packets generated by high priority workloads.

Figure 2:
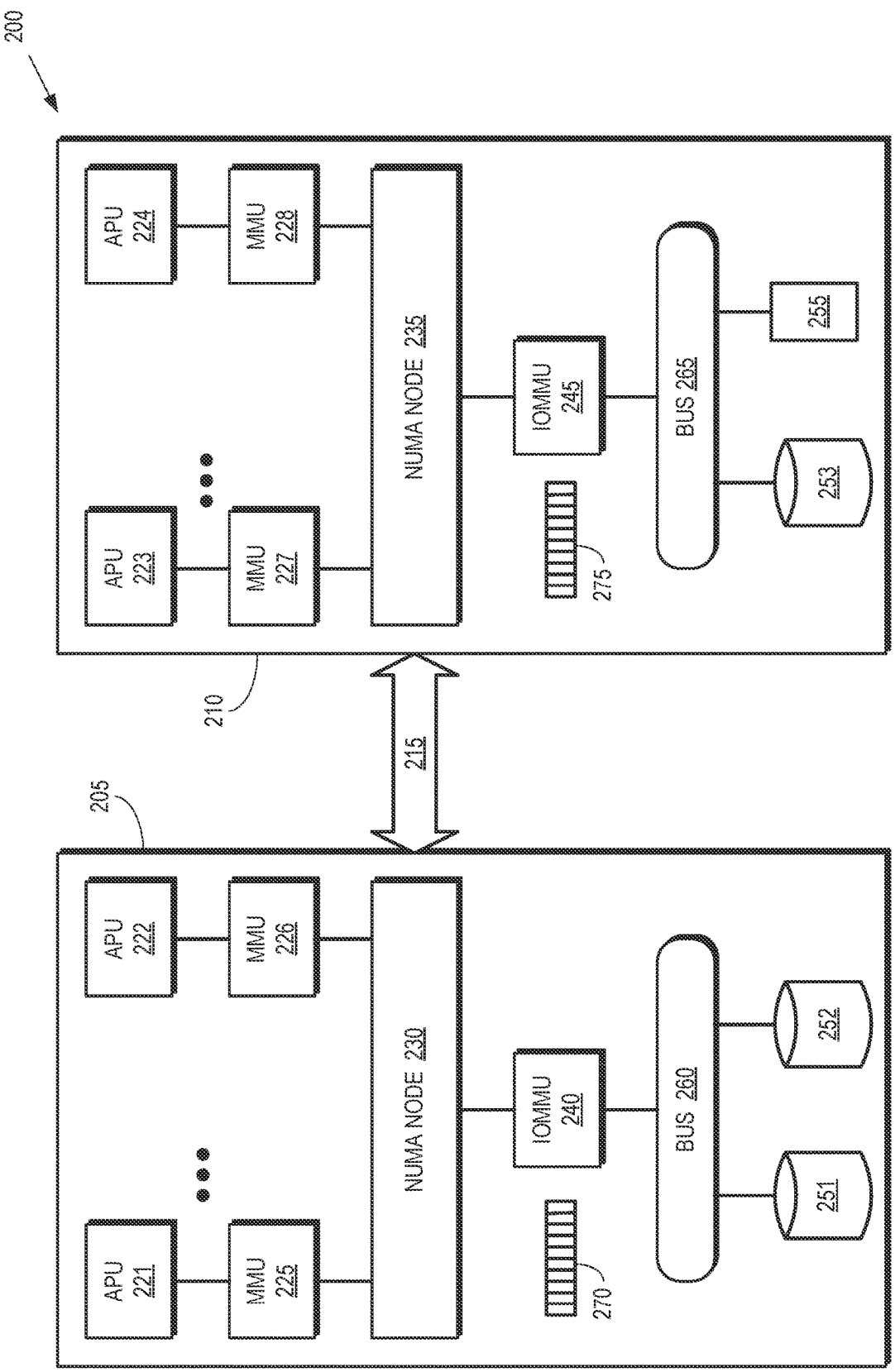
FIG. 2 is a block diagram of a portion of a server configured to be implemented in a cloud computing system according to some embodiments.

FIG. 2 is a block diagram of a portion 200 of a server configured to be implemented in a cloud computing system according to some embodiments. The portion 200 of the server includes chips 205, 210 that correspond to some embodiments of the chips 121-124 implemented by the server 101 shown in FIG. 1. The chips 205, 210 exchange packets over a link 215 that is supported by an inter-chip network such as the inter-chip network 141 implemented by the server 101 shown in FIG. 1. In some variations, the link 215 is a Hyper Transport technology link, which is a packetized local bus that allows high-speed data transfer between devices resulting in high throughput. Hyper Transport is a packet-based protocol that offers low latency and a unidirectional bandwidth of 12.8 gigabytes per second per link. Hyper Transport has low overhead, uses multiple virtual channels for deadlock avoidance, and defines fault tolerance mechanisms on the link level.

Each of the chips 205, 210 implements two or more processing units such as the APUs 221, 222, 223, 224, which are collectively referred to herein as "the APUs 221-224." In some variations, each of the APUs 221-224 is associated with a bridge such as a north bridge that is integrated in the same package as the corresponding APU. The bridges connect the APUs 221-224 to corresponding memory management units (MMUs) 225, 226, 227, 228, which are collectively referred to herein as "the MMUs 225-228" and which are configured to handle memory references for the corresponding APUs 221-224, e.g. by performing virtual-to-memory address translation. The MMUs 225-228 are therefore connected to memory elements such as non-uniform memory access (NUMA) nodes 230, 235 that include different types of random access memory (RAM). For example, the NUMA nodes 230, 235 can implement a combination of dynamic RAM (DRAM) and nonvolatile RAM (NVRAM).

Input/output MMUs (IOMMUs) 240, 245 are used to handle memory references associated with I/O devices such as NVRAM storage elements 251, 252, 253 (collectively referred to herein as "the NVRAM 251-253"), a network interface card 255, and the like. The IOMMUs 240, 245 are coupled to corresponding NVRAM 251-253 or the network interface card 255 by buses 260, 265. For example, the IOMMUs 240, 245 can be connected to one or more buses 260, 265 that implement peripheral component interconnect (PCI), PCI-X, or PCI Express interfaces that are bridged through a chipset component to the link 215, which can be implemented as one or more non-coherent Hyper Transport links. In some variations, I/O devices such as the NVRAM 251-253 or the network interface card 255 are attached directly to the link 215 by means of custom components or a Hyper Transport interface (not shown in FIG. 2).

The on-chip networks implemented by the chips 205, 210 therefore include the MMUs 225-228, the IOMMUs 240, 245, and the buses 260, 265. Some variations of the on-chip networks implemented by the chips 205, 210 also include other bridges, buses, links, routing elements, interfaces, and the like that are implemented in combination with the MMUs 225-228, the IOMMUs 240, 245, and the buses 260, 265 or instead of one or more of the MMUs 225-228, the IOMMUs 240, 245, and the buses 260, 265. The inter-chip network implemented in the portion 200 of the server is represented by the links 215.

The APUs 221-224 implement software that is used to initialize configurations of the on-chip network or the inter-chip network. In some variations, the initialization software (e.g. LinuxBIOS) configures the on-chip network and the inter-chip network during the boot-up process based on both the physical layout of the Hyper Transport hierarchy and the PCI devices attached to the hierarchy, which includes the link 215, the MMUs 225-228, the IOMMUs 240, 245, the buses 260, 265, and other elements that can be used to implement the on-chip network or the inter-chip network. The initialization software creates the necessary data structures for an operating system (OS) implemented by the APUs 221-224 and initializes system hardware components including the MMUs 225-228, the nodes 230, 235, the IOMMUs 240, 245, the buses 260, 265, the NVRAM 251-253, and the network interface card 255. The initialization software also sets the values of one or more hardware configuration registers 270, 275. Although the hardware configuration registers 270, 275 are depicted as separate entities on the chips 205, 210, some variations of the hardware configuration registers 270, 275 may be implemented as an integrated part of other elements on the chips 205, 210. The initialization software also configures the control of platform components. Transactions such as I/O and memory transactions can then be forwarded to the correct link 215 via the on-chip network, e.g. on a north bridge.

The APUs 221-224 also implement software that is used to dynamically modify configurations of the on-chip network or the inter-chip network, e.g., by modifying values in the hardware configuration registers 270, 275 on the fly. Using software defined networking (SDN) to dynamically reconfigure the on-chip or inter-chip network decouples network control and forwarding functions, enabling programmable control and configuration of the on-chip and inter-chip networks, in which case the underlying infrastructure can be abstracted from applications and network services. Dynamic reconfiguration using SDN also allows network managers to configure, manage, secure, and optimize network resources very quickly via dynamic, automated SDN programs, which can be written by the network managers or other third parties. In some variations, the on-chip and inter-chip networks are dynamically configurable based on workloads generated by applications executing on the APUs 221-224.

Figure 3:
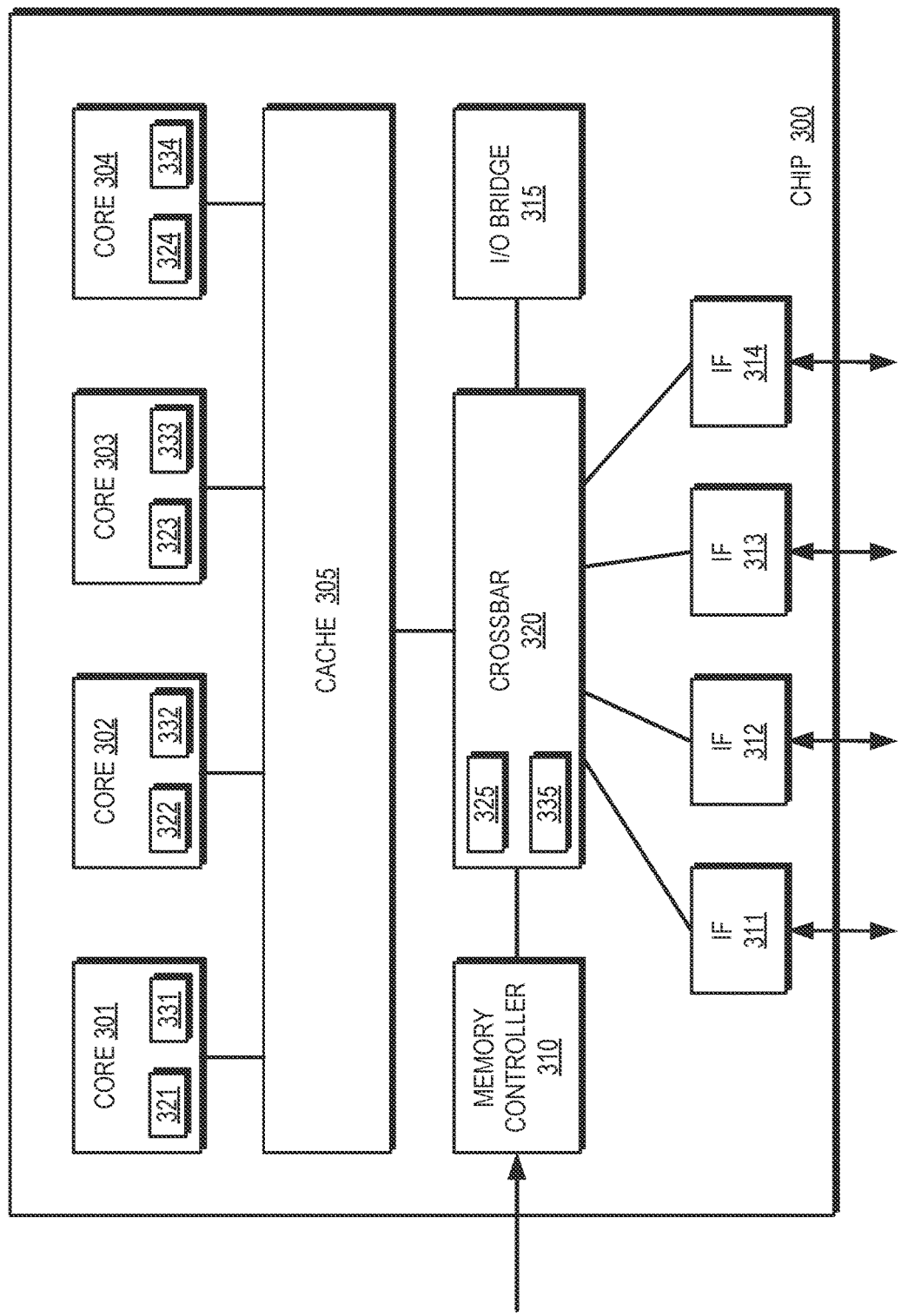
FIG. 3 is a block diagram of a chip that can be implemented in a server for a cloud computing system according to some embodiments.

FIG. 3 is a block diagram of a chip 300 that can be implemented in a server for a cloud computing system according to some embodiments. The chip 300 is used to implement some embodiments of the chips 121-124 implemented by the server 101 shown in FIG. 1. The chip 300 includes processor cores 301, 302, 303, 304 that are collectively referred to herein as "the cores 301-304." The four cores 301-304 can therefore be used to implement a quad-core processing unit. However, other variations of the chip 300 include more or fewer cores that implement different types of processing units. The cores 301-304 are associated with a cache 305 that stores copies of frequently accessed data or instructions so that the data or instructions can be accessed with higher bandwidth or lower latency than is provided by the memory (not shown in FIG. 3) that stores the original versions of the data or instructions. In some variations, the cache 305 represents a cache hierarchy that includes one or more cache levels such as an L3 cache, one or more L2 caches, and one or more L1 caches.

The chip 300 also includes a memory controller 310, one or more interfaces 311, 312, 313, 314 (collectively referred to herein as "the interfaces 311-314"), and an I/O bridge 315. The memory controller 310 controls the flow of information between the memory and the cache 305, the interfaces 311-314, or the I/O bridge 315. The interfaces 311-314 provide interfaces to convey information (such as packets) via an inter-chip network such as the inter-chip network 115 implemented by the server 101 shown in FIG. 1. Various I/O devices can be connected to the I/O bridge 315 to provide input or output that is generated or used by the cores 301-304, stored in the memory or the cache 305, or accessed from the memory or the cache 305.

The on-chip network for the chip 300 includes a crossbar switch 320 that routes information between entities on the chip 300 and entities that are connected to the chip 300. For example, the crossbar switch 320 can route packets between the cores 301-304 based on information stored in routing tables 321, 322, 323, 324, 325 that are collectively referred to herein as "the routing tables 321-325." Although the routing tables 321-325 shown in FIG. 3 are implemented in the cores 301-304 and the crossbar switch 320, some variations implement routing tables in more or fewer locations within the chip 300. For example, the crossbar switch 320 can implement a single routing table 325 and use this information to route packets that are received by the crossbar switch 320 from the cores 301-304, the memory controller 310, the interfaces 311-314, or the I/O bridge 315. As discussed herein, the crossbar switch 320 can be dynamically configured based on relative priorities of workloads that are executing on the cores 301-304.

In some variations, the relative priorities of the workloads are determined based on values of performance counters 331, 332, 333, 334, 335 (collectively referred to herein as "the counters 331-335") that are implemented in various locations on the chip 300. Although the counters 331-335 shown in FIG. 3 are implemented in the cores 301-304 and the crossbar switch 320, some variations implement performance counters in more or fewer locations within the chip 300. The counters 331-335 are used to collect information associated with portions of source code, characteristics of applications executing on the cores 301-304, numbers of address fetches, values of model specific registers, numbers of cache misses, numbers of cache hits, events that occur in bridges or buses, MMU events, and the like. The values of the counters 331-335 can then be used to evaluate relative priorities of workloads, as discussed herein.

Figure 4:
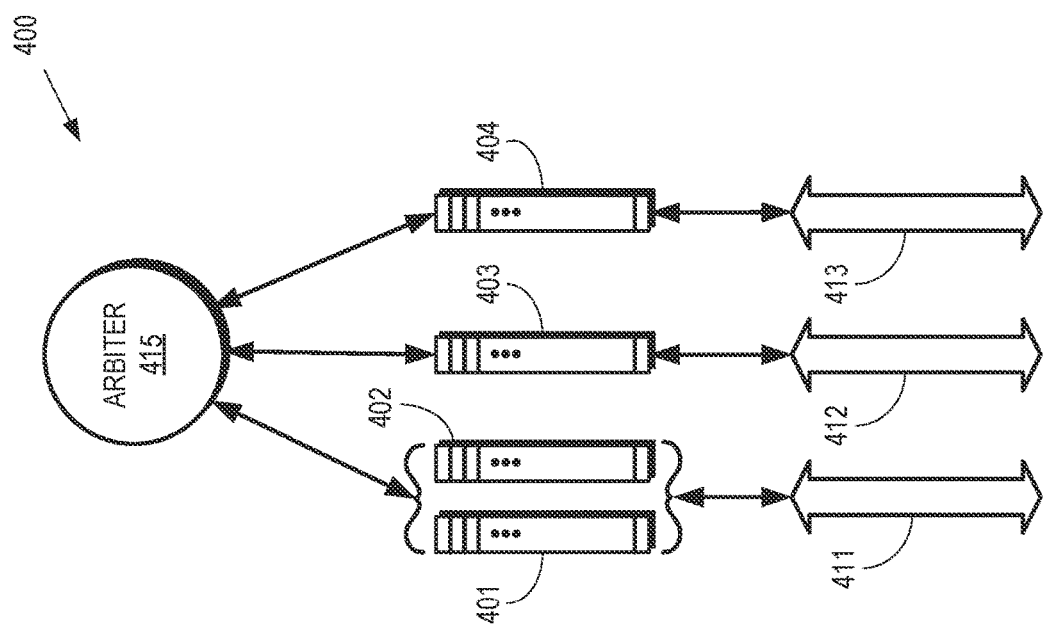
FIG. 4 is a block diagram of a portion of a chip that includes an on-chip network in a first configuration according to some embodiments

FIG. 4 is a block diagram of a portion 400 of a chip that includes an on-chip network in a first configuration according to some embodiments. The portion 400 of the chip is used to implement to some embodiments of the chips 121-124 implemented by the server 101 shown in FIG. 1 or some embodiments of the chip 300 shown in FIG. 3. The portion 400 includes a plurality of buffers 401, 402, 403, 404, which are collectively referred to herein as "the buffers 401-404." Entries in the buffers 401-404 hold packets that are scheduled for transmission over corresponding virtual channels 411, 412, 413, which are collectively referred to herein as "the virtual channels 411-413." The virtual channels 411-413 are implemented using an inter-chip network such as the inter-chip network 115 shown in FIG. 1 or an on-chip network such as the on-chip networks 141-144 shown in FIG. 1. The portion 400 of the chip also includes an arbiter 415 that schedules packets for transmission over the virtual channels 411-413 and provides the packets to the corresponding buffers 401-404. The arbiter 415 is implemented in some embodiments of the crossbar switch 320 shown in FIG. 3.

In some variations, the virtual channels 411-413 are separated into different types, which can prevent starvation on the bus that is used to implement the virtual channels 411-413. For example, Hyper Transport commands and data can be separated into one of three types of virtual channels: non-posted requests that are conveyed over the virtual channel 411, posted requests that are conveyed over the virtual channel 412, and responses that are conveyed over the virtual channel 413. Non-posted requests require a response from the receiver. All read requests and some write requests are non-posted requests. Posted requests do not require a response from the receiver. Write requests are posted requests. Responses are replies to non-posted requests. Read responses or target done responses to non-posted writes are types of response messages.

The buffers 401-404 are allocated to the virtual channels 411-413 based on relative priorities of the workloads that are generating packets for transmission over the corresponding virtual channels 411-413. For example, the priority of the one or more workloads that are generating packets for transmission over the virtual channel 411 may be larger than the priority for the one or more workloads that are generating packets for transmission over the virtual channels 412, 413. Two buffers 401, 402 are therefore allocated to the virtual channel 411, a single buffer 403 is allocated to the virtual channel 412, and a single buffer 404 is allocated to the virtual channel 413. Allocation of the resources of the chip that includes the buffers 401-404 is therefore workload-aware. In some variations, allocation of the buffers 401-404 to the virtual channels 411-413 is performed based on a weighted metric such as a weighted sum of the packet traffic on the virtual channels 411-413 and the relative priorities of the workloads generating the packet traffic for the virtual channels 411-413. In some variations, allocation of the resources of the chip can be using configuration registers such as the hardware configuration registers 270, 275 shown in FIG. 2. For example, the hardware configuration registers can include PCI-space configuration registers like D18F0x[F0,D0,B0,90] and D18F0x[F4,D4,B4,94] which specify the hard-allocated link flow-control buffer counts. The registers D18F3x140, D18F3x144, and D18F3x1[54,50,4C,48] specify the number of XCS (XBAR command scheduler) entries assigned to each virtual channel.

The arbiter 415 schedules packets for transmission over the virtual channels 411-413 and provides them to the corresponding buffers 401-404 based on arbitration policies that can be configured or reconfigured on the fly. In some variations, the arbitration policies for the virtual channels 411-413 are defined by a two-priority arbitration algorithm that allows streaming channels to interact with each other and with other traffic. The algorithm supports configurable bandwidth limits for high priority traffic, weighted arbitration for low priority traffic, and channel starvation prevention mechanisms. In some variations, the ports used by the arbiter 415 can be divided into three types: the Root Ports, the Switch Upstream Ports, and the Switch Downstream Ports. Each of the ports can provide up to four distinct services: native hot-plug, power management, advanced error reporting, and virtual channels. In some variations, configuration information can be saved or restored upon reset of the chip. The chip can also support command-line tools, e.g. "lspci-v" which allow detecting virtual channels that are supported by the chip.

The arbiter 415 implements an arbitration policy that schedules packets based on the relative priorities of the workloads generating the packets. For example, the arbiter 415 can preferentially schedule packets generated by high priority workloads associated with the virtual channel 411. The high-priority packets are then transmitted to one of the buffers 401, 402 that are associated with the virtual channel 411. Preferential scheduling of packets based on the relative priorities of the workloads can be implemented by configuring the arbitration weights for different types of workloads. In some variations, configuration of the arbiter 415 is performed using hardware configuration registers such as the configuration registers 270, 275 shown in FIG. 2. For example, the hardware configuration registers can include a D0F0x98_x08 ORB Upstream Arbitration Control set of registers, which specify the weights of a weighted round-robin packet arbiter. The hardware control registers can define a maximum number of non-posted, read requests that are serviced for a particular client before the arbiter 415 switches to the next client. A PCI port arbitration table can be configured using corresponding hardware configuration registers.

Allocation of the buffers 401-404 to the virtual channels 411-413 can be reconfigured on the fly in response to changes in the packet traffic, the relative priorities of the workloads generating the packet traffic, the weighted metric, or other events detected by the chip. For example, values of the hardware configuration registers that associate the buffers 401-404 to the different virtual channels 411-413 can be modified to change the associations. The arbiter 415 can also be reconfigured on the fly, e.g., by modifying values stored in the corresponding hardware configuration registers.

Figure 5:
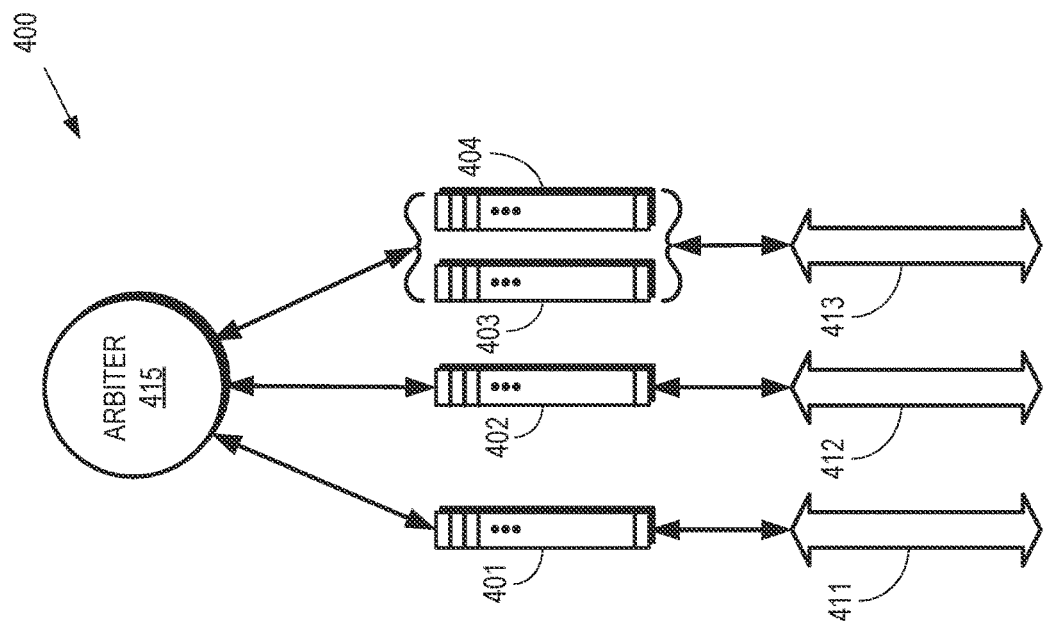
FIG. 5 is a block diagram of the portion of the chip shown in FIG. 4 that has been reconfigured in a second configuration according to some embodiments.

FIG. 5 is a block diagram of the portion 400 of the chip shown in FIG. 4 that has been reconfigured in a second configuration according to some embodiments. The second configuration of the portion 400 shown in FIG. 5 differs from the first configuration of the portion 400 shown in FIG. 4 because the allocation of the buffers 401-404 to the virtual channels 411-413 has been modified in response to changes in the relative priorities of the workloads associated with the virtual channels 411-413. For example, the relative priority of the workloads associated with the virtual channel 411 has decreased and the relative priority of the workloads associated with the virtual channel 413 has increased. Consequently, the number of buffers allocated to the virtual channel 411 has been reduced to a single buffer 401 and the number of buffers allocated to the virtual channel 413 has been increased to two buffers 403, 404. In some variations, the arbitration weights used by the arbiter 415 to schedule packets for transmissions over the virtual channels 411-413 are also modified in response to the changes in the relative priorities. For example, arbitration weights can be reduced for the packets generated by workloads associated with the virtual channel 411 and arbitration weights can be increased for the packets generated by workloads associated with the virtual channel 413. The arbiter 415 therefore changes from favoring granting channel access to packets generated by the workloads associated with the virtual channel 411 in the first configuration to favoring granting channel access to packets generated by the workloads associated with the virtual channel 413 in the second configuration.

Figure 6:
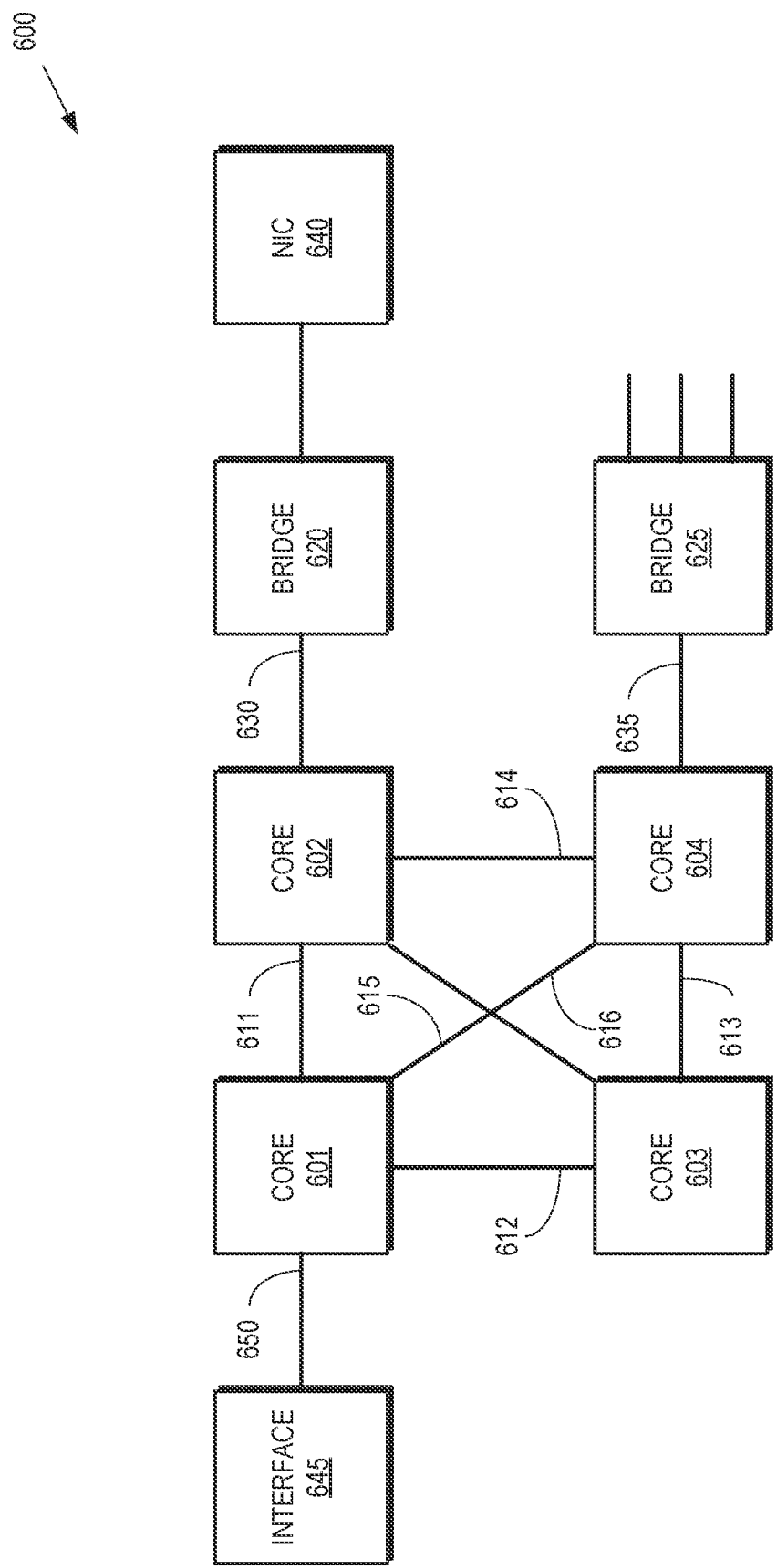
FIG. 6 is a block diagram of a chip that implements four interconnected processor cores according to some embodiments.

FIG. 6 is a block diagram of a chip 600 that implements four interconnected processor cores according to some embodiments. The chip 600 is used to implement to some embodiments of the chips 121-124 implemented by the server 101 shown in FIG. 1. The chip 600 includes processor cores 601, 602, 603, 604 that are collectively referred to herein as "the cores 601-604." The chip 600 can therefore be used to implement some embodiments of the chip 300 shown in FIG. 3. However, other variations of the chip 600 include more or fewer cores that implement different types of processing units. The cores 601-604 are interconnected with each other by links 611, 612, 613, 614, 615, 616 (collectively referred to herein as "the links 611-616") of an on-chip network. In some variations, the links 611-616 operate according to Hyper Transport and therefore include one or more virtual channels for conveying packets between the cores 601-604.

The chip 600 includes bridges 620, 625 that can be implemented as south bridges. In some variations, the bridges 620, 625 are connected to one or more of the cores 601-604 by links 630, 635 of the on-chip network. The links 630, 635 can be non-coherent links that are coupled to other devices such as a network interface adapter 640, or other PCI, universal serial bus (USB), or SATA I/O devices. The chip 600 further includes an interface 645 that is connected to one or more of the cores 601-604 by a link 650 of the on-chip network. For example, the interface 645 can be a PCI type connector to attach devices directly to one or more of the cores 601-604 without intermediate bridging.

The on-chip network of the chip 600 can be dynamically configured to selectively route packets based on relative priorities of the workloads generated by the cores 601-604. In some variations, dynamic configuration or reconfiguration of the routing is performed by modifying the contents of routing tables such as the routing tables 301-335 shown in FIG. 3. The packets conveyed over on-chip networks or inter-chip networks contain device information to identify the source and destination of the packet. Each device (e.g., one of the cores 601-604, the bridges 620, 625, or the interface 645) on the chip 600 refers to a routing table to determine the routing of a packet. In some variations, the routing tables maintain system configuration information such as system topology including a processor interconnect architecture, routing information, and the like. When a first device receives a packet, it determines whether the packet is for the first device or for some other device in the system. If the packet is for the first device, the first device processes the packet and if the packet is destined for another device, the first device looks up the routing tables for the destination routing of the packet and determines which of the links 611-616, 630, 635, 650 to use to forward the packet to its destination. The first device then forwards the packet on an appropriate link towards the destination of the packet. In some variations, a crossbar such as the crossbar switch 320 shown in FIG. 3 provides separate routing tables for routing Requests, Probes, and Responses. In some variations, messages traveling in the Request and Response virtual channels are point-to-point, whereas messages in the Probe virtual channel are broadcast to all nodes in the system.

The routing process implemented in the chip 600 can be split into two stages. The first step is to compare the address of every packet against the DRAM and MMIO address ranges that are defined by base/limit registers (accessible through PCI space). This lookup returns a NodeID that defines a home node of the requested DRAM or I/O address. This NodeID then indexes the routing table, which returns a corresponding one of the links 611-616, 630, 635, 650 to which the packet should be forwarded. The MMIO accesses that target an IO device that is connected to the local node are treated differently. In this case the destination link is directly provided by the base/limit registers without the need of indexing the routing table. The routing table is indexed (searched) using the destination node identifier in the request routing information field of the request packet. For example, bits in the request routing information field of a request packet can be configured as: Bit[0]—route to receiving node, Bit[1]—route to link 0, Bit[2]—route to link 1 and Bit[3]—route to link 2, and the like.

In some variations, routing is performed based on a type of a transaction that is associated with the packet. For example, three types of transactions can be defined for routing packets via a bridge such as a north bridge: (1) broadcast transactions, (2) request transactions, and (3) response transactions. The routing tables can therefore include routing registers for each node that specify the link to route each transaction type accessed through the routing table. As discussed herein, the routing tables can be dynamically reconfigured in response to changes in relative priorities of the workloads. The new routing configuration should be correct and consistent so that packets arrive at their destination and avoid deadlock.

Figure 7:
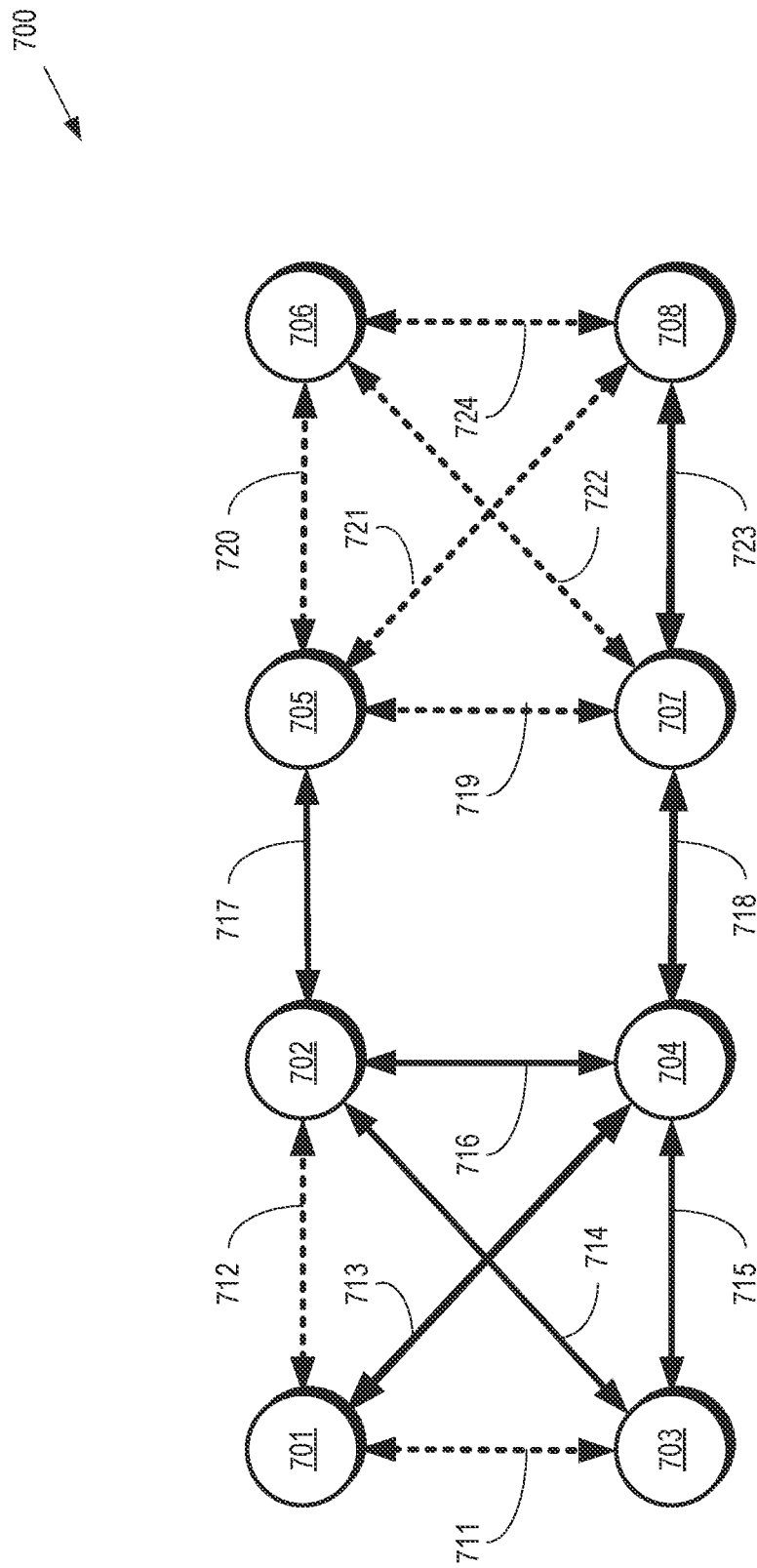
FIG. 7 is a block diagram of a processing system that includes multiple interconnected nodes according to some embodiments.

FIG. 7 is a block diagram of a processing system 700 that includes multiple interconnected nodes according to some embodiments. The nodes 701, 702, 703, 704, 705, 706, 707, 708 (collectively referred to herein as "the nodes 701-708") represent some embodiments of the processing units 131-138 implemented in the server 101 shown in FIG. 1. The nodes 701-708 are interconnected by links 711, 712, 713, 714, 715, 716, 717, 718, 719, 720, 721, 722, 723, 724, which are collectively referred to as "the links 711-724." As discussed herein, the links 711-724 form at least a portion of an on-chip network and an inter-chip network such as the on-chip networks 141-144 and the inter-chip network 115 implemented in the server 101 shown in FIG. 1.

The links 711-724 are selectively allocated to different workloads based on the relative priorities of the workloads. For example, a controller implemented by one of the nodes 701-708 (or some other processor) can create a designated route across the network for a high priority application. The high priority application is running on nodes 701 and 708. The rest of the server load is executing on nodes 702-705. The controller identifies the dedicated route by detecting the shortest path between nodes 701 and 708. The shortest path includes links 713, 718, and 723. The controller also identifies nodes 704 and 707 on the designated route. The controller then checks if the nodes 704, 707 are accessible via links that do not belong to the designated route in case other low priority applications are (or will be) running on one or more of the nodes 704, 707. If the nodes 704, 707 are not accessible, then the controller does not create the designated route because creating the designated route would isolate the nodes 704, 707 so that they could not communicate with other nodes. If the nodes 704, 707 are accessible by other links (such as the links 715, 716, 719, 722), the controller modifies the routing tables for the nodes 701, 704, 707, 708 along the designated route to create and reserve the designated route for the high-priority application. The controller then modifies the routing tables on the rest of the nodes to exclude the designated route so that other low priority applications are not able to transmit packets over the links 713, 718, 723 of the designated route. Once the high priority application has terminated, the controller can return the routing tables to their original states.

In some variations, peer-to-peer routing is supported between some of the nodes 701-708. For example, peer-to-peer routing can be used to establish direct connection between I/O devices associated with one or more of the nodes 701-708. Each device can also specify an address range over which peer-to-peer transactions are allowed. Transactions out of this address range continue to employ host reflected routing. In some cases, the peer-to-peer routing can be performed according to the PCI Express Advanced Switching (AS) protocol, which includes extensive peer-to-peer, multi-protocol support, message passing through multiple address domains, virtual channels for quality of service (QoS), multicast support and advanced link support features. In some variations, peer-to-peer routing is selectively used to route packets for applications based on relative priorities of the applications and, in some cases, the type of devices used by the application. For example, a relatively high priority application can be allocated a peer-to-peer connection between the nodes 701-708. Peer-to-peer transfers can achieve low latency because these transfers do not traverse the host's main memory, utilize the CPU, or incur additional redundant transfers over buses or bridges.

The relative priorities of workloads can be determined based on traces that are collected by monitoring values of performance counters such as the performance counters 331-335 shown in FIG. 3.

Table 1 outlines possible trace collection opportunities available on various systems. The first column indicates whether the method of collecting the traces is performed offline (e.g., prior to runtime for the applications that use the traces to determine relative priorities of workloads) or online (e.g., concurrently with execution of the applications that generate the workloads). The second column indicates whether the code changes are intrusive such that code is rewritten to implement the changes or non-intrusive. The third column indicates the amount of overhead required to perform trace collection. The fourth column indicates the granularity of the trace collection. The fifth column indicates a level of descriptiveness of the collected traces. Typically, the more descriptive a trace, the more overhead it requires to collect.

TABLE 1

| | Method | Code Changes | Overhead | Granularity | Descriptiveness |
|---|---|---|---|---|---|
| Code Instrumentation | Offline | Intrusive | High | Per Line of Code | High |
| Code Profiling | Online | Intrusive | Low | Per Line of Code | Medium |
| IBS Profiling | Online | Non-Intrusive | Sampling Rate Dependent | Per Process | Sampling Rate Dependent |
| Counter Profiling | Online | Non-Intrusive | Low | Per Process | Low |
| Device Specific Counters | Online | Non-Intrusive | Low | Per Device | Low |
| System Monitoring Tools | Online | Non-Intrusive | Low | Per Process or Thread | Low |
| Log Analysis | Online | Non-Intrusive | Depends | Per System Component | Depends |

Code instrumentation can be used for offline trace collection during a test run of the application that permits the slow-down related to such profiling. For example, data can be generated that indicates access patterns to memory regions and the data can be used by the OS to identify memory intensive structures, which can become networking intensive if the memory is placed on a remote memory node. The offline program analysis can be performed using third-party code analyzers. This information can then be aggregated and presented to the developer as a chart of the most or least frequently accessed data structures in a program along with their size and location in the program. Memory intensive structures can then be allocated higher priorities so that the workloads associated with the memory intensive structures are preferentially scheduled or routed, as discussed herein.

Code profiling can be used to collect traces on-the-fly based on source code annotations that are implemented prior to execution. For example, third-party tool libraries can be used to analyze the performance and execution characteristics of applications using a GPU by monitoring values of GPU performance counters. Although the library can be used on-the-fly with little overhead, some libraries require modifying source code of the application ahead of time, e.g. to include appropriate header files into the source code, utilize the provided API functions to profile the source code, and link the application against the library.

Instruction Based Sampling (IBS) can be used to collect trace information for particular processes on-the-fly by monitoring performance counters such as values of the counters maintained in the model specific registers MSRC001_1031 IBS Fetch Linear Address (IC_IBS_LIN_AD) or MSRC001_1032 IBS Fetch Physical Address (IC_IBS_PHYS_AD. To do so, the profiler selects an IBS sampling rate for profiling (higher rate means the accesses of more individual instructions captured, but also higher system overhead) and then collects a certain portion of accesses. A dynamic adaptation scheme can be utilized in which the sampling rate is reactively adjusted by the profiler based on the observed overhead of execution (e.g., as measured by the number of retired instructions per second within the interval).

Counter profiling provides information for all of the process instructions within a given interval with little overhead. For example, counter profiling can be used to detect spikes in usage of different system resources. In some variations, the usage of memory can be detected by an increase in misses from the CPU cache hierarchy, which is reflected by the performance counters that have values that indicate numbers of data cache misses, numbers of L2 cache misses, numbers of instruction cache misses, and the like. In an alternative embodiment, the chip interconnect traffic can be detected by performance counter events such as CPU requests to a target node or other North bridge requests.

Device specific profiling can also be used to collect relevant traces that can be used to establish priorities of workloads. Different devices can support different trace collection opportunities depending on the capabilities of the device. For example, a GPU API may provide information that is aggregated across many instructions and reflects the average, percentage, or total values of the information. The GPU API can also supply other metrics that indicate a percentage of time used to process instructions, a percentage of fetches that hit in a cache, percentage of texture fetches from a 2D texture, a ratio of rasterized pixels to a number of triangles after culling, and the like.

In some cases, the OS or associated middleware can collect traces using tools that are part of the OS package software package repository. For example, the network traffic can be detected by standard tools like iptables or netstat in Linux, which can provide the information on the amount of traffic exchanged by every process with each node in a cluster. The disk I/O can be detected by parsing the output of the iostat command.

Logging can be a valuable source of trace information about system functioning. For example, the IOMMU can detect and report several kinds of events that may arise due to unusual hardware or software behavior. When the IOMMU detects an event of any kind and event logging is enabled, it writes an appropriate event entry into the event log located in system memory, which is indicated by a system physical address and length of the event log. Events detected by the IOMMU include I/O page faults as well as hardware memory errors detected when walking the I/O page tables. IOMMU can also optionally write to the peripheral page service request queue and to a guest virtual log in system memory. Critical events are also reported in the hardware error registers, which can become overflown.

Figure 8:
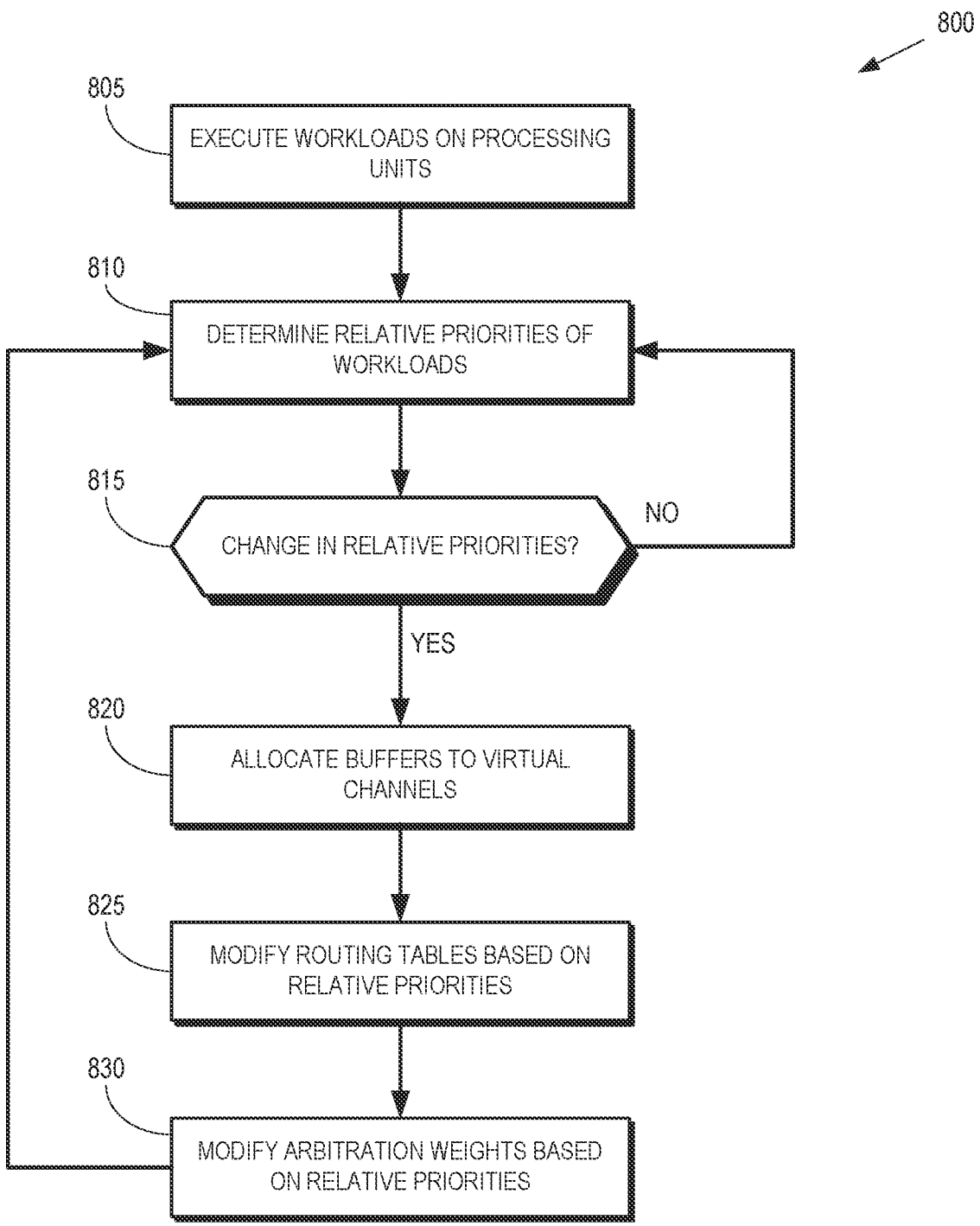
FIG. 8 is a flow diagram of a method for dynamically configuring on-chip or inter-chip networks according to some embodiments.

FIG. 8 is a flow diagram of a method 800 for dynamically configuring on-chip or inter-chip networks according to some embodiments. The method 800 is implemented by some embodiments of the cloud computing system 100 shown in FIG. 1. At block 805, one or more workloads begin executing on one or more processing units or cores. For example, workloads of different priorities can be executing on the processing units 131-138 shown in FIG. 1, the APUs 221-224 shown in FIG. 2, the cores 301-304 shown in FIG. 3, the cores 601-604 shown in FIG. 6, or the nodes 701-708 shown in FIG. 7.

At block 810, the relative priorities of the workloads are determined. In some variations, the relative priorities of the workloads are determined based on information provided by the applications generating the workloads such as control signaling, information packets, or information in the headers of the data packets generated by the workloads. The priorities of the workloads can also be determined based on traces that are collected by monitoring values of performance counters, as discussed herein. One or more on-chip or inter-chip networks implemented by the cloud computing system are then initialized on the basis of the determined priorities of the workloads, as discussed herein.

At decision block 815, the system determines whether the relative priorities of the workloads have changed. Changes in the relative priorities can be detected based on information provided by the applications that are generating the loads or changes in the traces associated with the workloads. As long as there has not been a change in the relative priorities, the system continues to monitor the relative priorities (or the messages or performance counters that are used to determine the relative priorities) at block 810. If a change in the relative priorities of the workloads is detected, the method flows to block 820.

At block 820, the system allocates buffers to virtual channels associated with the different workloads. For example, if the priorities of workloads associated with a first virtual channel have decreased and the priorities of workloads associated with a second virtual channel have increased, the system can decrease the number of buffers that are allocated to the first virtual channel and increase the number of buffers that are allocated to the second virtual channel.

At block 825, the system modifies routing tables based on the changes relative priorities of the workloads. For example, the routing tables can be modified to indicate a designated route that is reserved for transmitting packets generated by a workload in response to the priority of the workload increasing relative to the priorities of other workloads. For another example, designated routes indicated by the routing tables as being reserved for a relatively high-priority workload can be reconfigured so that other workloads can use the links along the designated route in response to the priority of the high-priority workload decreasing relative to the other workloads.

At block 830, arbitration weights used for different workloads can be modified based on the changes in the relative priorities of the workloads. For example, arbitration weights for a workload can be increased in response to the priority of the workload increasing relative to other workloads. For another example, arbitration weights for a workload can be decreased in response to the priority of the workload decreasing relative to other workloads.

Although the method 800 applies the modifications shown in blocks 820, 825, 830 in response to changes in the relative priorities of the workloads, some variations of the method 800 do not perform all of the operations shown in blocks 820, 825, 830 in all instances. For example, some variations of the method 800 may only apply the modifications in block 820. For another example, the modifications shown in blocks 820, 825, 830 can be selectively applied depending on estimates of the effectiveness of the different modifications in improving the overall packet throughput of the on-chip or inter-chip networks.

In some embodiments, the apparatus and techniques described above are implemented in a system comprising one or more integrated circuit (IC) devices (also referred to as integrated circuit packages or microchips), such as the cloud computing system described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium can include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above can be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method comprising:
accessing information indicating relative priorities of workloads that are executing on nodes of a server and generating packets for transmission over an on-chip network that connects the nodes; and
configuring the on-chip network by allocating resources of the on-chip network based on the relative priorities of the workloads, wherein allocating resources of the on-chip network includes allocating direct peer-to-peer connections of the on-chip network to workloads having a first priority of the relative priorities of the workloads such that based on a packet having the first priority, the packet having the first priority is transmitted on a first configured path of a plurality of configured paths between a source of the packet and a destination of the packet, the first configured path being directly between the source of the packet and the destination of the packet without traversing through any intermediate nodes and based on the packet having a second priority, the packet having the second priority is transmitted on a second configured path of the plurality of configured paths between the source of the packet and the destination of the packet.

2. The method of claim 1, wherein the second configured path of the plurality of configured paths includes one or more intermediate nodes between the source of the packet and the destination of the packet.

3. The method of claim 1, wherein allocating the resources of the on-chip network comprises allocating buffers to virtual channels supported by the on-chip network based on the relative priorities of the workloads associated with the virtual channels.

4. The method of claim 2, wherein configuring the on-chip network comprises configuring routing tables to route the packets over the on-chip network based on the relative priorities of the workloads that generate the packets.

5. The method of claim 4, wherein configuring the routing tables comprises configuring the routing tables to preferentially route packets generated by higher priority workloads via a subset of interconnections in the on-chip network.

6. The method of claim 4, wherein allocating the direct peer-to-peer connections comprises assigning an address range associated with the peer-to-peer connections to the workloads having the first priority.

7. The method of claim 1, wherein configuring the on-chip network comprises modifying arbitration weights to favor granting virtual channel access to packets generated by higher priority workloads.

8. The method of claim 1, wherein accessing the information indicating the relative priorities of the workloads comprises collecting traces associated with the workloads.

9. The method of claim 8, wherein collecting the traces associated with the workloads comprises collecting the traces using an offline program to identify memory intensive structures associated with the workloads.

10. The method of claim 8, wherein collecting the traces associated with the workloads comprises collecting the traces concurrently with executing code associated with the workloads by monitoring one or more counters associated with the nodes.

11. An apparatus comprising:
an on-chip network that connects a plurality of nodes; and
a controller circuit to configure the on-chip network by allocating resources of the on-chip network based on relative priorities of workloads that are executing on the nodes, wherein allocating resources of the on-chip network includes allocating direct peer-to-peer connections of the on-chip network to workloads having a first priority of the relative priorities of workloads such that based on a packet having the first priority, the packet having the first priority is transmitted on a first configured path of a plurality of configured paths between a source of the packet and a destination of the packet, the first configured path being directly between the source of the packet and the destination of the packet without traversing through any intermediate nodes, and based on the packet having a second priority, the packet having the second priority is transmitted on a second configured path of the plurality of configured paths between the source of the packet and the destination of the packet.

12. The apparatus of claim 11, wherein the second configured path of the plurality of configured paths includes one or more intermediate nodes between the source of the packet and the destination of the packet.

13. The apparatus of claim 11, further comprising:
a plurality of buffers to store packets for transmission over the on-chip network, and
wherein the controller circuit is to allocate the buffers to virtual channels supported by the on-chip network based on the relative priorities of the workloads associated with the virtual channels.

14. The apparatus of claim 11, further comprising:
a plurality of routing tables to store information for routing packets over the on-chip network, and
wherein the controller circuit is to configure the plurality of routing tables that route the packets based on the relative priorities of the workloads that generate the packets.

15. The apparatus of claim 14, wherein the controller circuit is to configure the plurality of routing tables to preferentially route packets generated by higher priority workloads via a subset of interconnections in the on-chip network.

16. The apparatus of claim 14, wherein the controller circuit is to allocate the direct peer-to-peer connections by assigning an address range associated with the peer-to-peer connections to the workloads having the first priority.

17. The apparatus of claim 11, further comprising:
an arbiter to grant packets access to virtual channels supported by the on-chip network, and
wherein the controller circuit is to modify arbitration weights used by the arbiter to favor granting access to the virtual channels to packets generated by higher priority workloads.

18. The apparatus of claim 11, further comprising:
at least one counter associated with the nodes, and
wherein the controller circuit is configured to monitor the at least one counter concurrently with executing code associated with the workloads and determine the relative priorities of the workloads based on traces generated from monitored values of the at least one counter.

19. An apparatus comprising:
an on-chip network that connects a plurality of nodes via a plurality of routing connections and a plurality of peer-to-peer connections; and
wherein the on-chip network is configured by allocating resources of the on-chip network based on relative priorities of workloads that are executing on the nodes, wherein allocating resources of the on-chip network includes allocating the plurality of peer-to-peer connections to workloads having a first priority of the relative priorities of workloads such that based on a packet having the first priority, the packet having the first priority is transmitted on a first configured path of a plurality of configured paths between a source of the packet having the first priority and a destination of the packet having the first priority, the first configured path being directly between the source of the packet having the first priority and the destination of the packet having the first priority without traversing through any intermediate nodes, and allocating routing connections, using routing tables, to one or more workloads having a second priority such that based on the packet having the second priority, the packet having the second priority is routed through a second configured path of the plurality of configured paths between the source of the packet and the destination of the packet, wherein the second configured path includes one or more intermediate nodes.

20. The apparatus of claim 19, wherein configuring the on-chip network comprises at least one of:
allocating buffers to virtual channels supported by the on-chip network based on the relative priorities of the workloads associated with the virtual channels;
configuring routing tables that route packets over the on-chip network based on the relative priorities of the workloads that generate the packets; and
modifying arbitration weights to favor granting access to the virtual channels to packets generated by higher priority workloads.

* * * * *